United States Patent [19]
Gordon

[11] 3,979,610
[45] Sept. 7, 1976

[54] POWER REGULATOR CIRCUIT
[75] Inventor: Robert Gordon, Palm Beach Gardens, Fla.
[73] Assignee: International Telephone and Telegraph Corporation, Nutley, N.J.
[22] Filed: Jan. 27, 1975
[21] Appl. No.: 544,247

[52] U.S. Cl. .............................. 307/297; 307/296; 307/254; 323/22 T
[51] Int. Cl.² ........................................ H03K 17/00
[58] Field of Search .......... 307/254, 297; 323/22 T, 323/16, 4, 9, 6

[56] References Cited
UNITED STATES PATENTS

| | | | |
|---|---|---|---|
| 3,378,758 | 4/1968 | Goodenow | 323/22 T |
| 3,497,794 | 2/1970 | Fredrickson et al. | 323/22 T |
| 3,599,079 | 8/1971 | Ansbro | 323/22 T |
| 3,707,635 | 12/1972 | Kawashima | 307/297 |

Primary Examiner—Stanley D. Miller, Jr.
Assistant Examiner—B. P. Davis
Attorney, Agent, or Firm—John T. O'Halloran; Vincent Ingrassia; Peter Van Der Sluys

[57] ABSTRACT

This relates to a monolithically integrable circuit for providing an effective constant voltage to automobile instruments; fuel, temperature, etc. The standard bimetallic switch is replaced by a power amplifier which is turned on and off by a Schmidt trigger circuit. A capacitor charge/discharge circuit is charged by a current source, the output of which varies with output voltage. When the switch level of the Schmidt trigger is reached, the power amplifier is turned off and the output grounded via the instruments. This turns off the charging source and turns on a discharging source. In this manner, the on/off ratio of the output is varied to supply an effective constant voltage to the instruments.

4 Claims, 1 Drawing Figure

U.S. Patent  Sept. 7, 1976  3,979,610
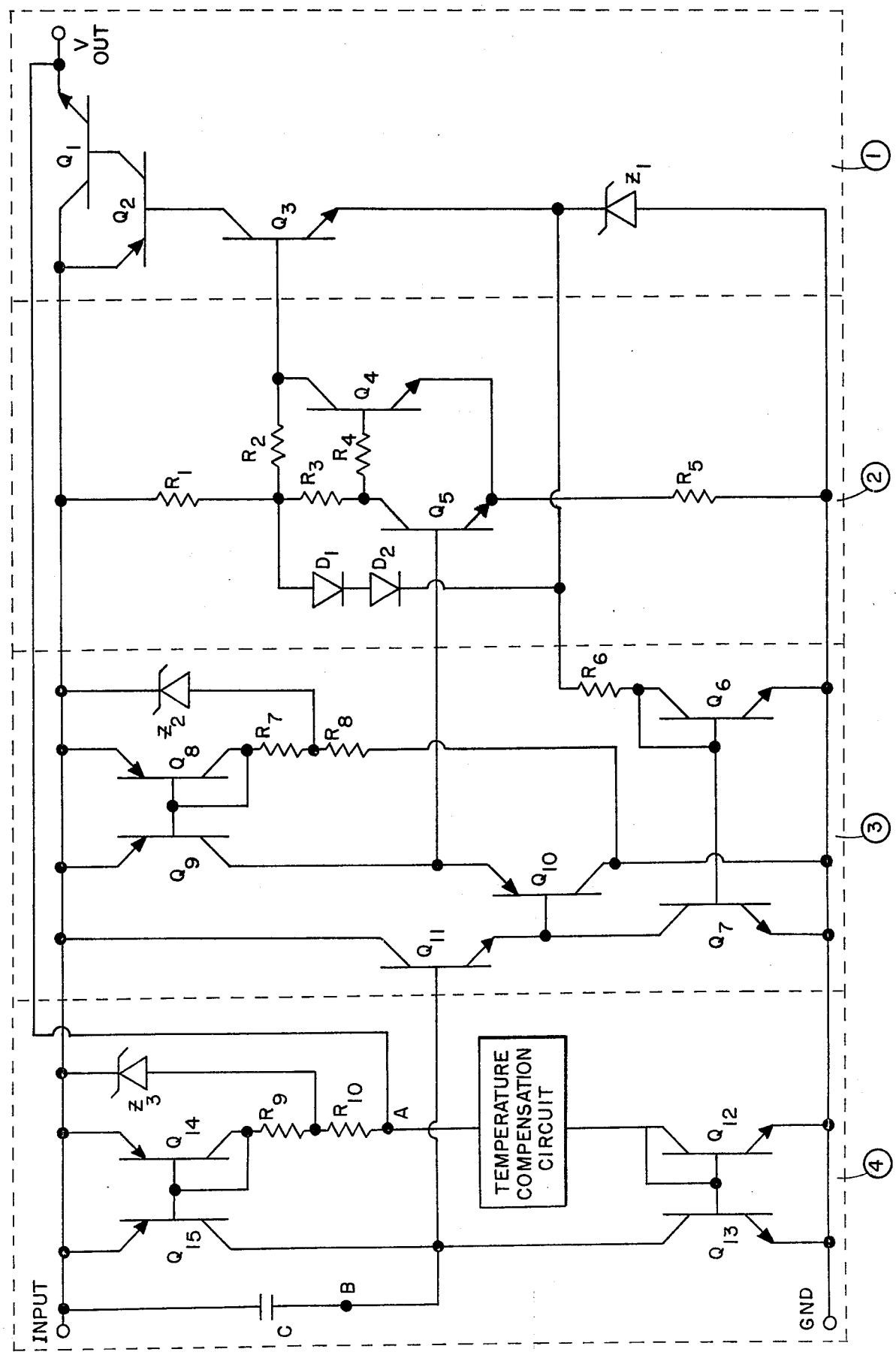

POWER REGULATOR CIRCUIT

BACKGROUND OF THE INVENTION

This invention relates to a monolithically integrable power regulator circuit and, more particularly, to a circuit for supplying an effective constant voltage to automobile instrument gauges.

The standard approach of using a bi-metallic switch to control power applied to automobile instrument gauges is well known. However, the use of such a switch presents certain problems. First, the opening and closing of the bi-metallic switch produces RF noise which may manifest itself as static in an automobile radio or stereo system. Secondly, it is not uncommon that the contacts of the bi-metallic switch remain closed due to sticking, allowing excessive voltage to be applied to the instrument gauges, thereby damaging the gauges.

Since automobile gauges presently have a very low manufactured cost, it is highly desirable that these gauges continue to be employed. Therefore, any electrical analog to the standard bi-metallic switch must be compatible with existing gauges. Further, the electrical analog must be capable of supplying a constant output, notwithstanding the fact that the source (battery) voltage may vary substantially from the desired output. For example, it is not uncommon that the battery voltage varies between 8 and 16 volts.

SUMMARY OF THE INVENTION

It is an object of the present invention to provide a monolithically integrable circuit for supplying a constant average voltage output to automobile instrument gauges, notwithstanding a large variation in the applied input voltage.

It is a further object of the invention that power dissipation within the circuit be kept to a minimum.

Finally, it is an object of the invention to provide a circuit which is capable of being monolithically integrated on a single chip.

According to a broad aspect of the invention, there is provided a monolithic integrable power regulator circuit for supplying an effective constant voltage to instrument gauges comprising: a switching amplifier having an output voltage which corresponds to said effective constant voltage; a trigger circuit for driving said switching amplifier; and means responsive to said output voltage and coupled to said trigger circuit for triggering said switching amplifier ON when said output voltage has a first predetermined value for a first predetermined duration and for triggering said switching amplifier OFF when said output voltage has a second predetermined value for a second predetermined duration.

The above and other objects of the present invention will be more clearly understood from the following detailed description taken in conjunction with the accompanying drawing in which:

BRIEF DESCRIPTION OF THE DRAWING

The sole FIGURE is a schematic circuit diagram of the inventive power regulator circuit.

DESCRIPTION OF THE PREFERRED EMBODIMENT

The inventive circuit comprises four functional units; a switching amplifier unit 1, a Schmidt trigger circuit 2, an interface circuit 3, and a capacitor charge/discharge circuit 4. The switching amplifier 1 comprises transistors Q1, Q2 and Q3. The output of the circuit is taken off the emitter of transistor Q1 which performs the open/close function of the prior art bi-metallic switch. Transistor Q2 drives transistor Q1 in a power amplifier mode. The power amplifier is turned on when an input voltage supplied to the base of transistor Q3 by Schmidt trigger circuit exceeds a predetermined value, turning Q3 on and driving transistor Q2.

Schmidt trigger circuit 2 consists of transistors Q4 and Q5 and resistors R1 through R5. Diodes D1 and D2, in conjunction with zener diode Z1, fix the voltage level at which transistor Q3 will turn on.

The capacitor charge/discharge circuit comprises a capacitor C, first and second constant current sources Q12, Q13 and Q14, Q15 respectively. Zener diode Z3 maintains a predetermined current through resistor R9 and the emitter-collector path of transistor Q14. Since Q14 has a high gain, the base current can be considered to be insignificant. It should be noted that the output voltage taken from the emitter of transistor Q1 is fed back to junction point A of the capacitor charge/discharge circuit 4.

It will be seen from the drawing that a temperature compensation circuit which matches the temperature coefficient of the gauges is inserted between the first and second current sources. The use of temperature compensation circuits is well known, and numerous designs are available, depending on specific circuit parameters and requirements. A further discussion of this circuit is not deemed necessary since the details of design are not considered a part of this invention.

Interface circuit 3 serves as a buffer between capacitor C and the base of transistor Q5 of the Schmidt trigger. It is necessary to supply such a buffer since the input impedance of a Schmidt trigger changes drastically during normal operation. Interface circuit 3 comprises two constant current sources Q6, Q7 and Q8, Q9 respectively.

These constant current sources and their associated emitter follower transistors Q11 and Q10 provide a constant load on capacitor C, while still providing the capability of driving the wide variations of impedances of Schmidt trigger circuit 2.

The circuit operates as described hereinbelow:

If transistor Q1 is off, the voltage fed back from the emitter of transistor Q1 to junction point A will have a value of zero volts since the output is grounded via the instruments. The applications of zero volts to point A causes current source transistor Q14 to turn on. Zener diode Z3 maintains a predetermined current through transistor Q14 and resistor R9. Since transistor Q14 is conducting, transistor Q15 will be turned on due to a matching of their base emitter voltages. (This results in a reduction of voltage across capacitor C, thereby causing the voltage on the base of transistor Q11 to increase.) For the sake of explanation, it must be assumed that capacitor C had been previously charged, resulting in a low voltage on the base of transistor Q11. This voltage and the base voltage of Q11 is transmitted via interface circuit 3 to the base of transistor Q5. When this voltage reaches a predetermined level, transistor Q5 will be turned on and transistor Q4 will turn off. This results in a turning on of transistor Q3, which causes transistor Q2 to conduct, driving transistor Q1 to the on state, thereby supplying an output voltage.

Since transistor Q1 is now conducting, the voltage on point A has a value equivalent to that of the regulated output voltage. This results in a turning off of transistors Q14 and Q15 and a turning on of current source transistors Q12 and Q13. With Q13 conducting, the voltage across capacitor C increases, lowering the voltage on the base of transistor Q11, and therefore on the base of transistor Q5, until such time as transistor Q5 turns off, turning on transistor Q4. This results in a voltage on the base of transistor Q3 which is below the value of zener diode Z1. Transistor Q3 turns off, resulting in an opening of switch Q1.

Continued operation of this circuit in a manner described above yields a constant average voltage which is applied to the instrument gauges. Further, it can be seen that the elements which comprise the inventive circuit can be easily integrated on a single chip.

While the principles of the invention have been described above in connection with specific apparatus, it is to be clearly understood that this description is made by way of example and not as a limitation on the scope of the invention.

What is claimed is:

1. A monolithic integrable power regulator circuit for supplying an effective constant voltage to instrument gauges comprising:
    a switching amplifier having an output voltage which corresponds to said effective constant voltage;
    a trigger circuit for driving said switching amplifier;
    means responsive to said output voltage for triggering said switching amplifier ON when said output voltage has a first predetermined value for a first predetermined duration and for triggering said switching amplifier OFF when said output voltage has a second predetermined value for a second predetermined duration; and
    buffer means coupled between said responsive means and said trigger circuit.

2. A monolithic integrable power regulator circuit according to claim 1 wherein said means responsive comprises:
    a capacitor;
    a first source of current coupled to said output voltage for charging said capacitor when said output voltage has said second predetermind value; and
    a second source of current coupled to said output voltage for discharging said capacitor when said output voltage has said first predetermined value, said capacitor coupled to the input of said trigger circuit.

3. A monolithic integrable power regulator circuit according to claim 2, said trigger circuit is a Schmidt trigger having an output coupled to said switching amplifier.

4. A monolithic integrable power regulator circuit according to claim 3 wherein said buffer comprises:
    a third source of current;
    a first emitter follower transistor coupled to said third source;
    a fourth source of current; and
    a second emitter follower transistor having a base, emitter and collector, said emitter coupled to said fourth source of current and to the base of said first emitter follower transistor and said base coupled to said capacitor.

* * * * *